United States Patent
Srimal

(10) Patent No.: US 10,552,561 B2
(45) Date of Patent: Feb. 4, 2020

(54) HYBRID OUT OF CONTEXT HIERARCHICAL DESIGN FLOW FOR HIERARCHICAL TIMING CONVERGENCE OF INTEGRATED CIRCUITS FOR OUT OF CONTEXT SIGNOFF ANALYSIS

(71) Applicant: INTERNATIONAL BUSINESS MACHINES CORPORATION, Armonk, NY (US)

(72) Inventor: Nitin Srimal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 15/797,735

(22) Filed: Oct. 30, 2017

(65) Prior Publication Data
US 2018/0068041 A1   Mar. 8, 2018

Related U.S. Application Data

(63) Continuation of application No. 14/929,969, filed on Nov. 2, 2015, now Pat. No. 9,836,566.

(51) Int. Cl.
  *G06F 17/50* (2006.01)
(52) U.S. Cl.
  CPC ........ *G06F 17/5031* (2013.01); *G06F 17/504* (2013.01); *G06F 17/5045* (2013.01); *G06F 17/5068* (2013.01); *G06F 2217/84* (2013.01)
(58) Field of Classification Search
  CPC ............. G06F 17/5031; G06F 17/5068; G06F 17/504; G06F 17/5045; G06F 2217/84
  See application file for complete search history.

(56) References Cited

U.S. PATENT DOCUMENTS

| | | | |
|---|---|---|---|
| 6,615,395 B1 * | 9/2003 | Hathaway | G06F 17/5031 716/113 |
| 7,383,522 B2 * | 6/2008 | Murgai | G06F 17/5031 716/113 |

(Continued)

FOREIGN PATENT DOCUMENTS

| | | |
|---|---|---|
| WO | 02101600 | 12/2002 |
| WO | 03021499 | 3/2003 |
| WO | 2011159712 | 12/2011 |

OTHER PUBLICATIONS

Li, Bing, et al; "On Timing Model Extraction and Hierarchical Statistical Timing Analysis." Computer-Aided Design of Integrated Circuits and Systems, IEEE Transactions on 32, No. 3 (2013): 367-380.

(Continued)

*Primary Examiner* — Naum Levin
(74) *Attorney, Agent, or Firm* — Steven Meyers; Andrew M. Calderon; Roberts Mlotkowski Safran Cole & Calderon, P.C.

(57) ABSTRACT

A computer-implemented method for a hierarchical design flow for deterministic or statistical timing convergence of VLSI circuits enabling design reuse, concurrency and out of context signoff analysis includes: defining, by a computing device, component clock definitions; performing static timing analysis on a lower level component of a circuit design; performing a timing closure for the lower level component based on performing the static timing analysis; generating a timing abstract associated with the lower level component; performing static timing analysis on a higher level component of the circuit design using the timing abstract and the results of the out-of-context timing analysis of the lower level component; generating smart guidance assertions based on performing the static timing analysis on the higher level component; and storing the smart guidance assertions (Continued)

for performing a subsequent timing analysis on the lower level component.

11 Claims, 14 Drawing Sheets

(56) References Cited

U.S. PATENT DOCUMENTS

| | | | | |
|---|---|---|---|---|
| 7,784,003 | B2 * | 8/2010 | Buck | G06F 17/5031 |
| | | | | 716/113 |
| 7,987,440 | B2 | 7/2011 | Kalafala et al. | |
| 8,141,014 | B2 * | 3/2012 | Foreman | G06F 17/5031 |
| | | | | 716/108 |
| 8,239,798 | B1 | 8/2012 | Goyal et al. | |
| 8,381,150 | B2 | 2/2013 | Zolotov et al. | |
| 8,446,224 | B2 * | 5/2013 | Cortadella | G06F 17/505 |
| | | | | 331/172 |
| 8,572,532 | B1 | 10/2013 | Singh et al. | |
| 8,578,310 | B2 | 11/2013 | Kalafala et al. | |
| 8,656,207 | B2 * | 2/2014 | Buck | H03L 7/08 |
| | | | | 713/503 |
| 8,677,298 | B1 * | 3/2014 | Manohararajah | G06F 17/5054 |
| | | | | 716/116 |
| 8,689,158 | B2 | 4/2014 | Kalafala et al. | |
| 9,342,639 | B1 | 5/2016 | Casey et al. | |
| 9,690,899 | B2 * | 6/2017 | Rao | G06F 17/5031 |
| 9,836,566 | B2 * | 12/2017 | Srimal | G06F 17/5031 |
| 2009/0019411 | A1 | 1/2009 | Chandra et al. | |
| 2010/0180242 | A1 | 7/2010 | Kalafala et al. | |
| 2010/0211922 | A1 | 8/2010 | Sinha et al. | |
| 2011/0035714 | A1 | 2/2011 | Foreman et al. | |
| 2013/0227507 | A1 | 8/2013 | Dartu et al. | |
| 2017/0124236 | A1 | 5/2017 | Srimal | |

OTHER PUBLICATIONS

Yang, Yu-Ming, et al; "iTimerC; common path pessimism removal using effective reduction methods" In Proceedings of the 2014 IEEE/ACM International Conference on Computer-Aided Design, pp. 600-605. IEEE Press, 2014.

List of IBM Patents or Patent Applications Treated as Related 1 page.

* cited by examiner

Next level with full gate level netlist instantiated

Next level with timing model re-use

HYBRID OUT OF CONTEXT HIERARCHICAL DESIGN FLOW FOR HIERARCHICAL TIMING CONVERGENCE OF INTEGRATED CIRCUITS FOR OUT OF CONTEXT SIGNOFF ANALYSIS

BACKGROUND

The present invention is generally related to the field of Electronic Design Automation (EDA) and more particularly to deterministic and statistical static timing convergence of Very Large Scale Integrated (VLSI) designs.

Synchronous digital systems consist of a network of computation nodes (combinational logic gates) and memory elements (registers). Each register is controlled by a clock signal and depending on the state of the clock, the data at the register input is either effectively isolated from its output or transmitted to the output.

The measure of digital circuit performance of synchronous digital systems has traditionally been the operational clock frequency of the design. Static timing analysis (STA) techniques are commonly used to ensure that the digital circuit design meets the clock frequency targets. Static timing analysis methods compare the target frequency of the design with the frequency of operation of the circuit and identify the circuit which would need to be optimized to meet the frequency goals.

Static timing analysis computer aided design tools (CAD) computes the latest and earliest arrival times of signals within a digital circuit. In order to compute the arrival times of the signals static timing analysis does delay measurements across the circuit elements (typically gates) using pre-characterized library data.

In a synchronous system, in order for a register to operate correctly when the clock signal arrives, a timing analysis program is primarily concerned with two kinds of timing errors. A setup fail occurs when the data signal arrives too late and misses the clock signal. A hold fail occurs when the data signal changes too early after the clock transition. The arrival time of a signal can vary because of numerous factors such as the logical implementation of the circuit, operating conditions and the manufacturing variability. Although these delay measurements can be done through circuit simulations such an approach is likely to be exponentially runtime prohibitive to be of any practical significance for even small designs.

Another benefit of STA is that it is a vector-less or vector independent approach of measuring circuit performance. STA techniques are algorithmically fast, efficient and provide an accurate analysis of circuit performance in synchronous digital systems. The objective of STA to provide complete coverage of the entire design and analyze every path as opposed to vector based circuit simulations.

The impact of process variability in modern day chip designs and manufacturing is significant in terms of the timing performance of a given VLSI circuit. In addition to process variability, environmental variations (e.g., variations in power supply VDD and temperature) contribute to the uncertainty in the design timing characteristics. Statistical Static Timing Analysis (SSTA) has subsequently emerged as a solution to address the issues and considers the impact of variations during timing analysis and optimization. In SSTA, timing quantities, such as delays and slews are treated as random variables with known distributions. Each timing quantity may be sensitive to multiple global sources of variability which are termed parameters. Moreover, a timing quantity is also considered to be sensitive to an uncorrelated or local source of variability.

The design, development, and manufacturing of very large scale integrated circuits (VLSI) is a complex effort. The chip designs are increasing both in size and complexity with each technology generation. In order to design such massive System on Chips (SoCs) and multi-core microprocessors, hierarchical design techniques are commonly used.

Hierarchical design techniques involve dividing a design represented by a chip-level netlist into more manageable components. These components are known as hierarchical components or design components. These can be sub-divided further into additional hierarchical components.

Hierarchical design techniques offer several advantages. Geographically, dispersed engineering teams can concurrently work on the design and development activities of these hierarchical components. This enables the design activities to be managed more efficiently. From an Electronic Design Automation (EDA) perspective, this brings higher tool capacities, practical tool runtimes and memory requirements. Another advantage is the ability to share and reuse design components across multiple designs and design teams.

Despite the above advantages, hierarchical design techniques rely on the use of abstract models for compact representation. A wide variety of abstract models are available for hierarchical deterministic or statistical static timing analysis. These models typically tradeoff accuracy for compact representation and add to the analysis complexity.

Existing techniques involve recursive hierarchical static timing analysis on the lower level component and the upper level component. The results from the static timing analysis of the upper level component are feedback for updating the constraints for the lower level block and the results of the static timing analysis of the lower level block are feedback for updating the abstract representation at the upper level block. This basic approach although primitive provided faster STA runtimes as compared to conventional flat STA runtimes.

However, this approach is not ideal, since design reuse and concurrent design is disabled. Additionally, the approach is extremely recursive or iterative which increases timing convergence TAT. Typically, designers working on a complex processor design or a SOC perform numerous (e.g., more than 25 design iterations) before they can converge. Each of these design iterations can trigger recursive timing iterations which can significantly increase the design TAT.

As designs become larger and more complex, hierarchical design techniques are essential. Concurrency and design reuse have to be an integral part of the hierarchical design methodology. However, design construction/closure iterations should be minimized and timing pessimism should be reduced to enable accurate and efficient timing analysis.

SUMMARY

In an aspect of the invention, a computer-implemented method for hierarchical design flow for timing convergence of circuits includes: defining, by a computing device, component clock definitions; performing, by the computing device, static timing analysis on a lower level component of a circuit design out of context; performing, by the computing device, a timing closure for the lower level component based on performing the static timing analysis; generating, by the computing device, a timing abstract associated with the lower level component; performing, by the computing device, static timing analysis on a higher level component of the circuit design using the timing abstract and on results of the out-of-context timing analysis of the lower level component; generating, by the computing device, smart guidance assertions based on performing the static timing analysis on the higher level component; and storing, by the computing device, the smart guidance assertions for performing a subsequent timing analysis on an additional lower level component.

In another aspect of the invention, there is a computer program product for reducing timing pessimism during out of context component level analysis. The computer program product comprising a computer readable storage medium having program instructions embodied therewith. The program instructions executable by a computing device cause the computing device to: generate smart guidance assertions for reducing timing pessimism during out of context component level analysis, wherein generating the smart guidance assertions cause the computing device to: identify instances in which a lower level component is used in a circuit design; identify a superset of all clocks entering the lower level component; define clock definitions by assuming a full common path pessimism removal (CPPR) credit for a leading edge of the clocks; determine a slowest transition time for each clock; based on defining the clock definitions; determine a slowest projected active and inactive pulse widths for each clock based on computing the slowest transition time for each clock; and determine early and late trailing edge arrival times for the lower level component based on determining the slowest projected active and inactive pulse widths, wherein determining the early and late trailing edge arrival times is based on early and late splits which should be credited by the CPPR.

In another aspect of the invention, a system includes a CPU, a computer readable memory and a computer readable storage medium associated with a computing device; program instructions to identify instances in which a lower level component is used in a circuit design; program instructions to obtain a clock specification associated with the lower level component; program instructions to query in-context clock latencies for all edges associated with the lower level component; program instructions to determine a normalization in clock latencies to be applied to all data (arrival times) ATs for each clock; program instructions to populate a look up table of the clocks and the corresponding latency normalization to be applied; and program instructions to generate normalized primary input (PI) data arrival times for data belonging to both interacting and non-interacting clocks domains for the component. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
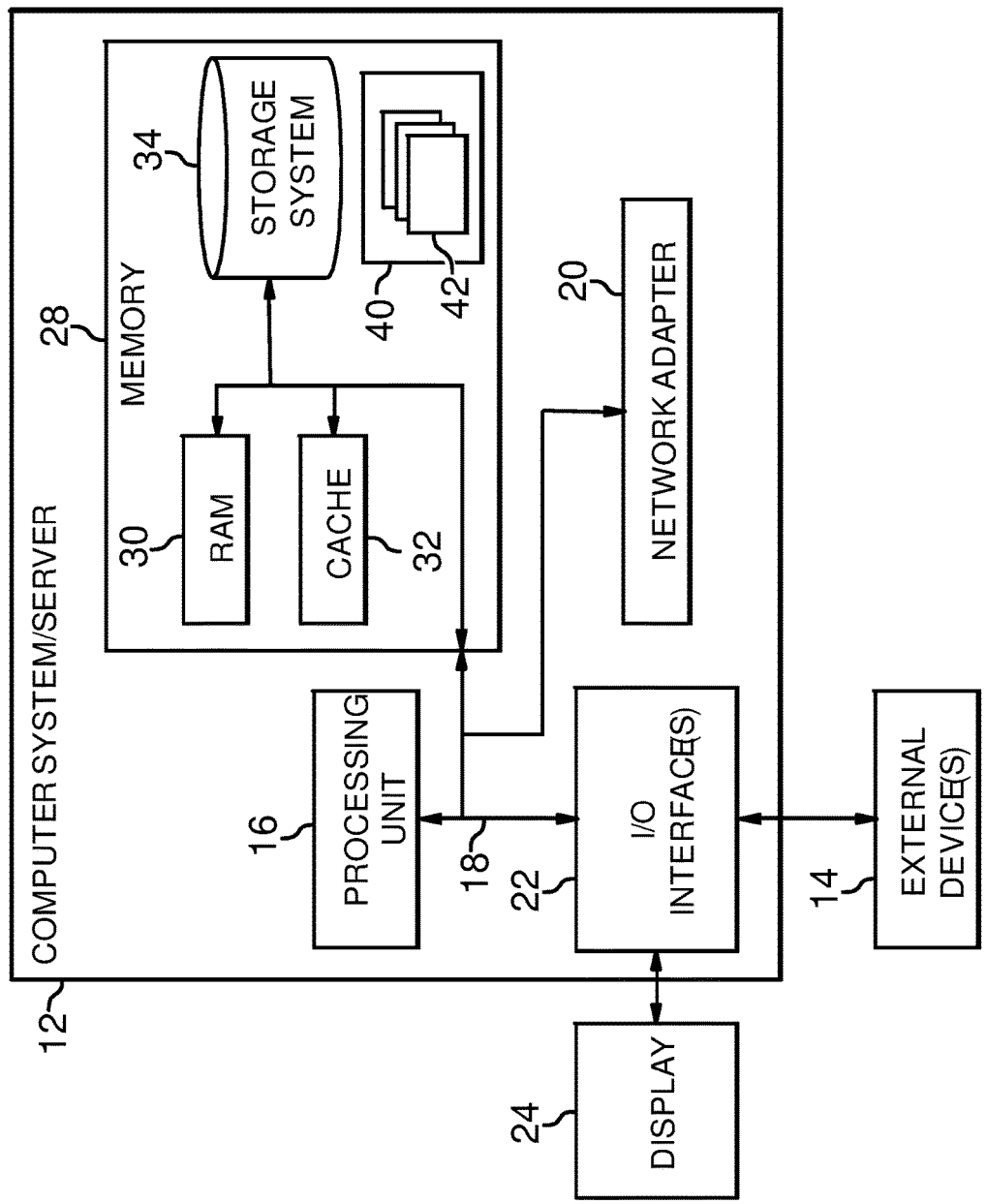
FIG. 1 shows an illustrative environment for implementing the steps in accordance with aspects of the invention.

The present invention is generally related to the field of Electronic Design Automation (EDA) and more particularly to deterministic and statistical static timing analysis of Very Large Scale Integrated (VLSI) designs. In accordance with aspects of the present invention, there is computer program for a hierarchical design flow to reduce the turnaround time (TAT) for timing convergence of VLSI circuits. In embodiments of the invention, a solution is provided for hierarchical timing analysis of VLSI circuits enabling design reuse, concurrency and out of context signoff analysis. In embodiments, a solution is provided for hierarchical timing analysis of VLSI circuits with accuracy and consistent results while obtaining static timing analysis (STA) runtimes and memory requirements which are considerably smaller than conventional static timing analysis. In embodiments of the invention, deterministic or STA on a lower level design component Out of Context (OOC) is performed. In embodiments, aggregate constraints and netlists of lower level design components are used to generate an abstract representation of the lower level design component.

In embodiments, deterministic or statistical STA is performed on upper level design components using upper level netlist, upper level constraints, and the abstract representation and results of the Out of Context static timing analysis of the lower level design component. Further, the abstract representation is reused for each occurrence of the lower level design component, thereby leading to more manageable upper level design and better EDA tool STA/SSTA runtimes and memory requirements. In embodiments, one of multiple abstract representation methods for instantiating the lower level design component in the upper level design is selected. Further, an Out of Context static timing analysis of lower level components and upper level components can be performed concurrently which significantly improves design productivity. In further embodiments, the assertions guidance is employed for lower level component clock definitions for reducing timing pessimism during Out of Context component level analysis. Also, lower level components may be constrained such that the hierarchical interface paths and feed-through paths are optimized accurately during design construction.

Advantageously, hierarchical timing analysis is performed with higher accuracy for signoff timing with the flexibility of out of context timing analysis. Aspects of the present invention allow the same hierarchical timing analysis flow for design construction and Out of context timing analysis, thereby simplifying and streamlining the timing analysis.

Embodiments of the present invention implement a solution for hierarchical deterministic or statistical static timing convergence of an integrated circuit. The solution provides faster design construction TAT over conventional hierarchical design solutions by minimizing the number of design iterations. The solution enables high accuracy during signoff timing analysis and further enables a common hierarchical design flow for design construction and signoff timing analysis. Embodiments of the solution also enable significantly smaller STA runtimes than commonly used flat STA methods.

In embodiments, deterministic or statistical static timing analysis is performed on a lower level design component Out of Context. As described herein, constraints and the netlist for lower level design components are used to generate an abstract representation of the lower level design component. Deterministic or statistical static timing analysis is performed on the upper level design component using an upper level netlist, upper level constraints, and the abstract representation and results of the Out of Context static timing analysis of the lower level design component. Smart assertions guidance (e.g., including smart clock definitions) for lower level components may be also generated. The smart clock definitions can be used for reducing timing pessimism during Out of Context component level analysis. Smart assertions may also be provided for constraining lower level components such that the hierarchical interface paths and feed-through paths are optimized accurately during design construction.

Aspects of the present invention provide a method and apparatus, service and a computer implementation for a hierarchical design flow for timing convergence of Very Large Scale Integrated (VLSI) circuits.

Aspects of the present invention provides a solution for hierarchical timing analysis of Very Large Scale Integrated (VLSI) circuits enabling design reuse, concurrency and out of context signoff analysis.

Aspects of the present invention provide a solution for hierarchical timing analysis of Very Large Scale Integrated (VLSI) circuits with accuracy and consistent results while obtaining STA (static timing analysis) runtimes and memory requirements which are considerably smaller than conventional flat static timing analysis.

Aspects of the present invention provide a method and apparatus, service and computer program for performing deterministic or statistical static timing analysis on a lower level design component out of context; performing, by the computing device, a timing closure for the lower level component based on performing the static timing analysis; generating, by the computing device, a timing abstract associated with the lower level component; performing, by the computing device, static timing analysis on a higher level component of the circuit design using the timing abstract; generating, by the computing device, smart guidance assertions based on performing the static timing analysis on the higher level component; and storing, by the computing device, the smart guidance assertions for performing a subsequent timing analysis on the lower level components.

In embodiments, defining the component clock definitions includes defining the component clock definitions based on information from a design specification associated with the circuit design.

Aspects of the present invention provide a method for consuming constraints for the lower level design component and generating an abstract representation of the lower level design component.

In embodiments, the circuit design is a Very Large Scale Integrated (VLSI) design or a system on chip (SOC). In this embodiment, the method includes deterministic or statistical static timing analysis on the next level design component incorporating the next level netlist, the next level constraints wherein the abstract representation and results of the out of context static timing analysis of the lower level design component are substituted in place of a full gate level netlist for the lower level component at a next level of circuit design hierarchy.

Aspects of the present invention enable the abstract representation to be reused for each occurrence of the lower level design component leading to more manageable upper level design and better EDA tool STA/SSTA runtimes and memory requirements.

Aspects of the present invention may select one of several abstract representation methods for instantiating the lower level design component in the upper level design.

Aspects of the present invention may permit out of context static timing analysis of lower level components and the next level components to proceed concurrently which significantly improves design productivity.

Aspects of the present invention may provide assertions guidance for lower level component clock definitions for reducing timing pessimism during out of context component level analysis.

Aspects of the present invention may constrain lower level components such that the hierarchical interface paths and feed-through paths are optimized accurately during design construction.

Aspects of the present invention permit hierarchical timing analysis with higher accuracy for signoff timing with the flexibility of out of context timing analysis.

Aspects of the present invention permit the same hierarchical timing analysis flow for design construction and out of context timing analysis.

In aspects of the invention, there is a computer program product for placing lower level components on the shelf and reused across the design. The computer program product comprising a computer readable storage medium having program instructions embodied therewith. The program instructions executable by a computing device cause the computing device to: reuse the abstract representation for each occurrence of the lower level design component leading to more manageable upper level design and better EDA tool runtimes and memory requirements. Since the method includes out of context static timing analysis of the lower level component the circuit design of the upper level component and the lower level component can proceed concurrently which significantly improves design productivity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The Program/utility 40 may include one or more program modules 42 that generally carry out the functions and/or methodologies of embodiments of the invention as described herein. Specifically, the program modules 42 may reduce TAT and pessimism to enable efficient timing closure. Other functionalities of the program modules 42 are described further herein such that the program modules 42 are not limited to the functions described above. The program modules 42 may also be referred to as a statistical timing analysis (STA) comment 42 that carries out the above functions.

Figure 2:
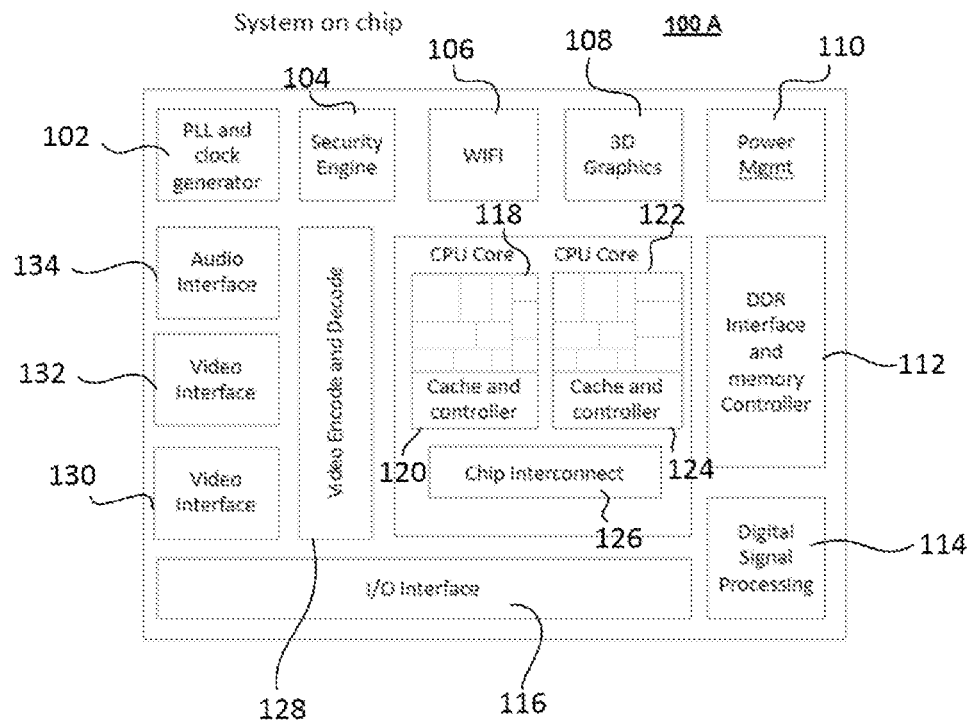
FIG. 2 is a representative diagram of components of a very large scale integrated circuit in accordance with aspects of the invention.

FIG. 2 shows an example of a System on chip (SoC) 100A in accordance with aspects of the present invention. The SoC 100A may include a phase-locked loop (PLL) clock generator 102, a security engine 104, a WiFi component 106, a 3D graphics component 108, a power management component 110, a double data rate (DDR) interface and memory controller 112, a digital signal processing component 114, an input/output (I/O) interface 116, a CPU core 118, a cache and controller 120, a CPU core 122, a cache and controller 124, a chip interconnect 126, a video encode and decode component 128, a video interface 130, a video interface 132, and an audio interface 134. The components of SoC 100A may be standard "off-the-shelf" components or customized components known in the state of the art. The components shown in FIG. 2 are shown for illustrative purposes only, and in practice, the SoC 100A may include additional, fewer, or differently arranged components than those shown in FIG. 2.

Also, functions of separate components may be integrated into a single component. Further, functions of a single component may be divided into multiple different components.

The design, development, and manufacturing of very large scale integrated circuits (VLSI) is a complex effort. The chip designs are increasing both in size and complexity with each technology generation. In order to design such massive system on chips (SoCs) and multi-core microprocessors, hierarchical design techniques are used. A hierarchical design technique involves dividing a design represented by a chip-level netlist into more manageable components (e.g., blocks, macro blocks, macros, etc.). These components are also known as hierarchical components or design components. These can be sub-divided further into additional hierarchical components. The components can be further sub-divided into smaller components or blocks. The component can be sub-divided any number of times to create an N-level hierarchical representation of the design. The sub-divisions could be based on several factors such as the functionality of the components, ease of design, performance and capacity in terms of runtime and memory requirements associated with the EDA design tools. Similarly, the logical and physical hierarchical representations of the chip level design could be different.

Figure 3:
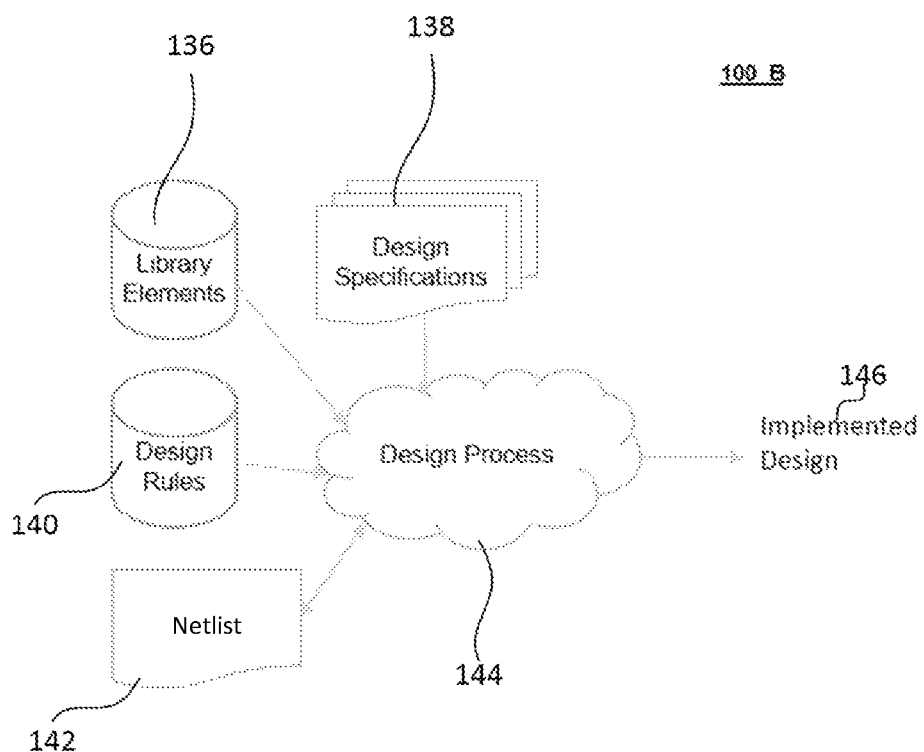
FIG. 3 is a representative design implementation diagram.

FIG. 3 shows a representative design implementation flow 100B in accordance with aspects of the present invention. As shown in FIG. 3, information regarding library elements 136, design specifications 138, design rules 140, and a netlist 142 may be inputs to a design process 144 for creating an implemented design 146. The library elements 136 may include information identifying components that can be used in the development of integrated circuits and SoCs (e.g., capacitors, transistors, resistors, inductors, conductors, or combination of such components). The design specifications 138 may include information identifying operating functions and/or parameters to which the final design should adhere. The design rules 140 may include general information identifying whether a design can or cannot be manufactured. The netlist 142 may identify a list of terminals, e.g., pins, of electrical components and a list of the electrical conductors that interconnect the terminals.

From an EDA perspective, the flow 100B yields higher tool capacities, practical tool runtimes and memory requirements during design implementation and analysis. Another substantial advantage is the ability to share and reuse design components across multiple designs and design teams.

In embodiments, lower level design components are represented by abstract models. A variety of abstract models are available for hierarchical deterministic or statistical static timing analysis. These models typically tradeoff accuracy for compact representation. These abstract models may add to the analysis complexity.

Figure 4:
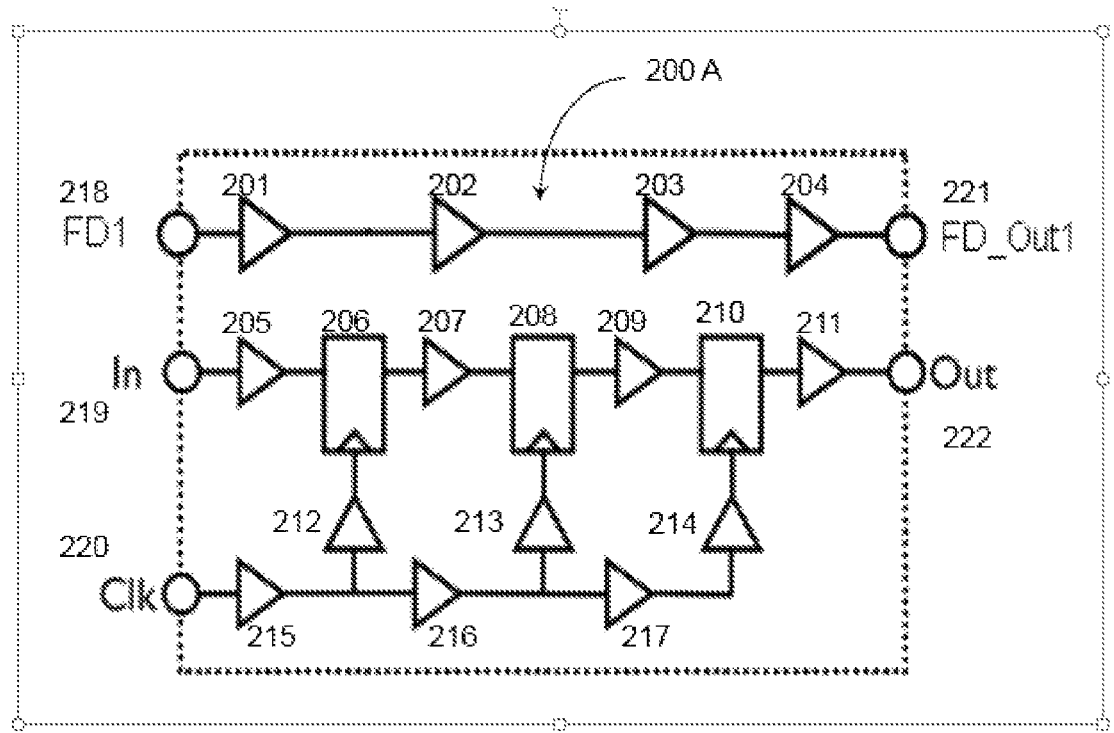
FIG. 4 is an illustrative representation of a gate level physical netlist of a lower level component generated and consumed in a hierarchical design flow.
Figure 5:
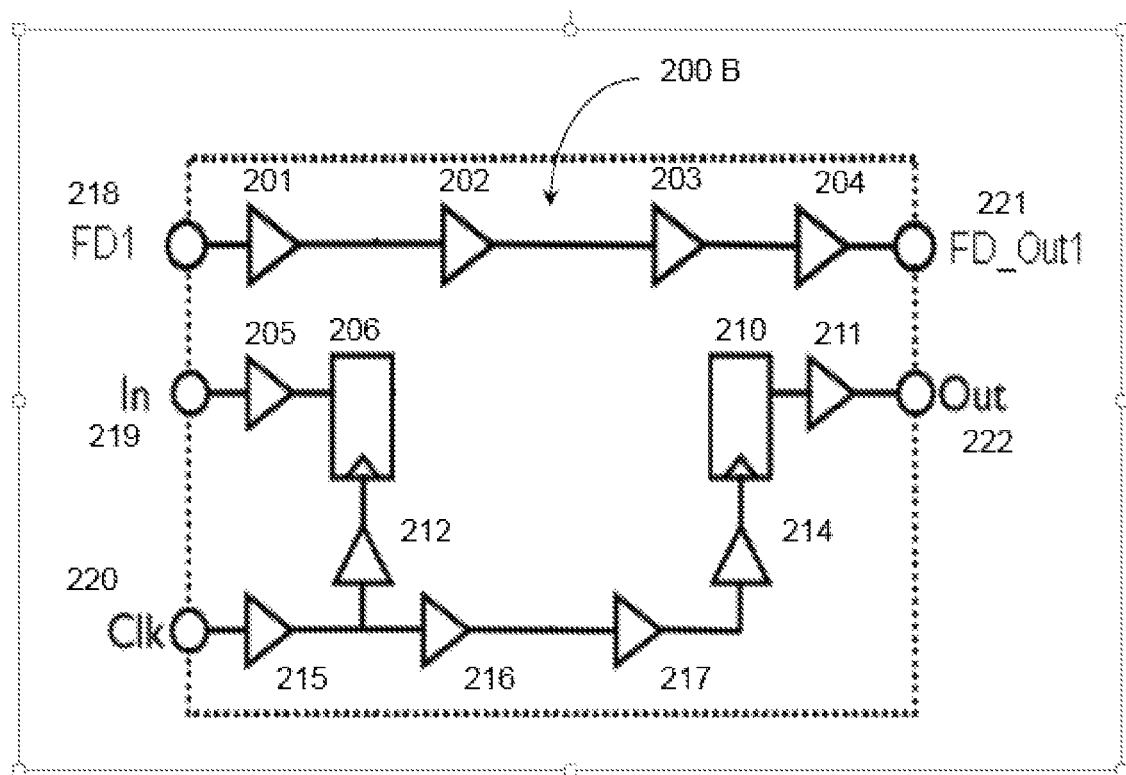
FIG. 5 is an illustrative representation of a gate level physical netlist transformed into one of several abstract model representations generated and consumed in a hierarchical design flow.

FIG. 4 shows an illustrative circuit representation 200A in accordance with aspects of the present invention. FIG. 5 shows a compact representation 200B of the same lower level component circuit representation. Elements 207, 208, 209, and 213 are pruned from the compact model representation 200A of FIG. 4, since these elements are completely confined in the latch to latch logic paths in the lower level hierarchy. The compact representation 200B can be substituted in place of the full gate level netlist for the component at the next level of circuit design hierarchy. Referring back to FIG. 4, a latch to latch path from 206 to 208 and 208 to 210 is logically confined to the lower level component. This allows these latch to latch paths to be pruned from the netlist representation in 200B as shown in FIG. 5. Similarly, interface paths 219 to 206 and 210 to 222 are represented in entirety at the upper hierarchy levels and are retained in the abstract representation. The same is also true for the clock elements 212, 214, 215, 216, 217 and feed-through path 201-204.

Figure 6:
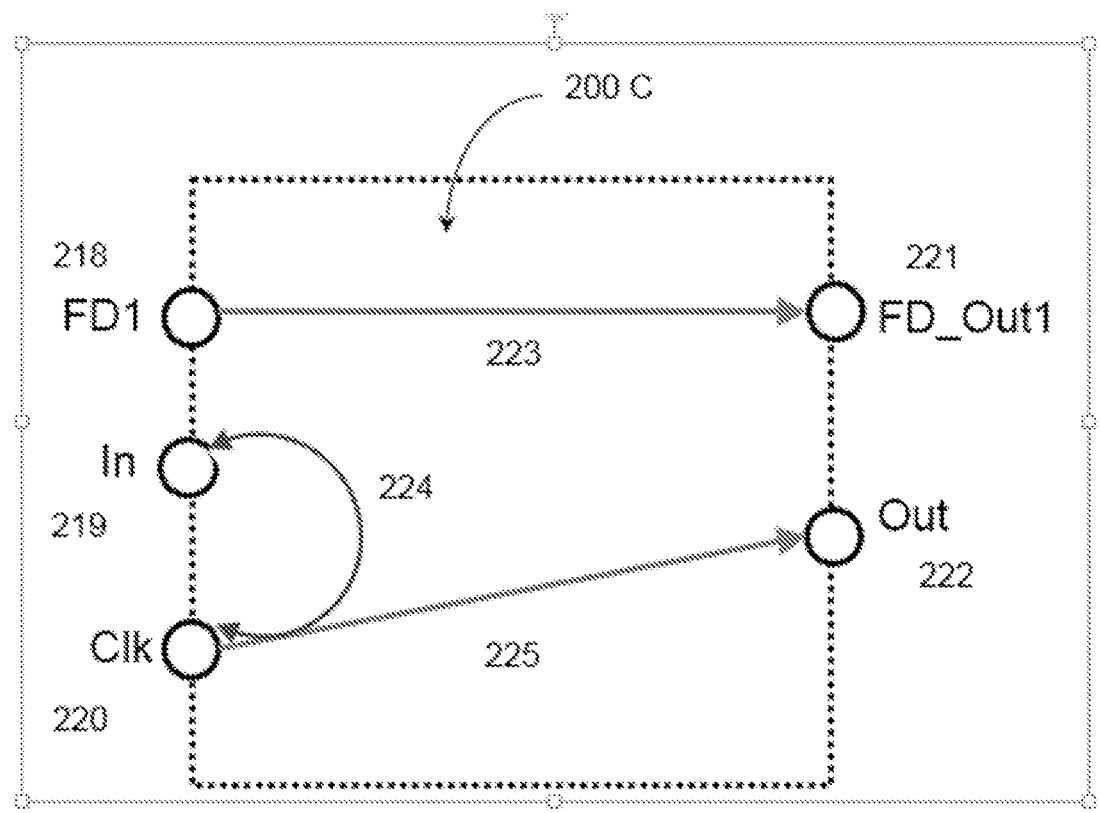
FIG. 6 is an illustrative representation of a gate level physical netlist transformed into another abstract model representation and generated and consumed in a hierarchical design flow.

FIG. 6 shows another example of a compact abstract representation 200C of the circuit netlist. In the representation 200C, the circuit netlist is compactly represented by a timing arc 223 from 218 to 221 and timing tests 224 from 219 to 220 and clock to out path 225 from 220 to 222.

Figure 7:
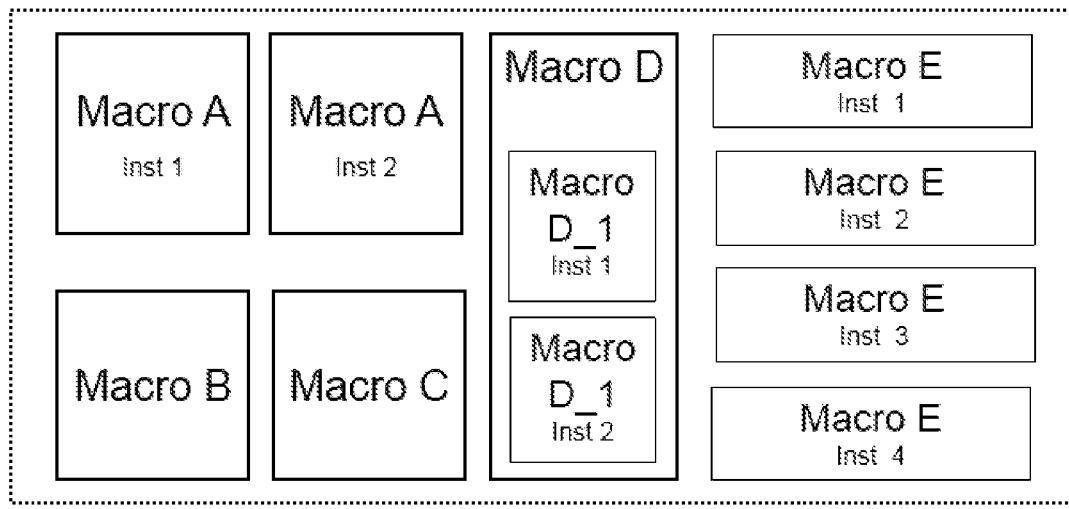
FIG. 7 is an illustrative representation of a hierarchical physical netlist where the complete netlist of the lower level component is instantiated in the next level component.
Figure 8:
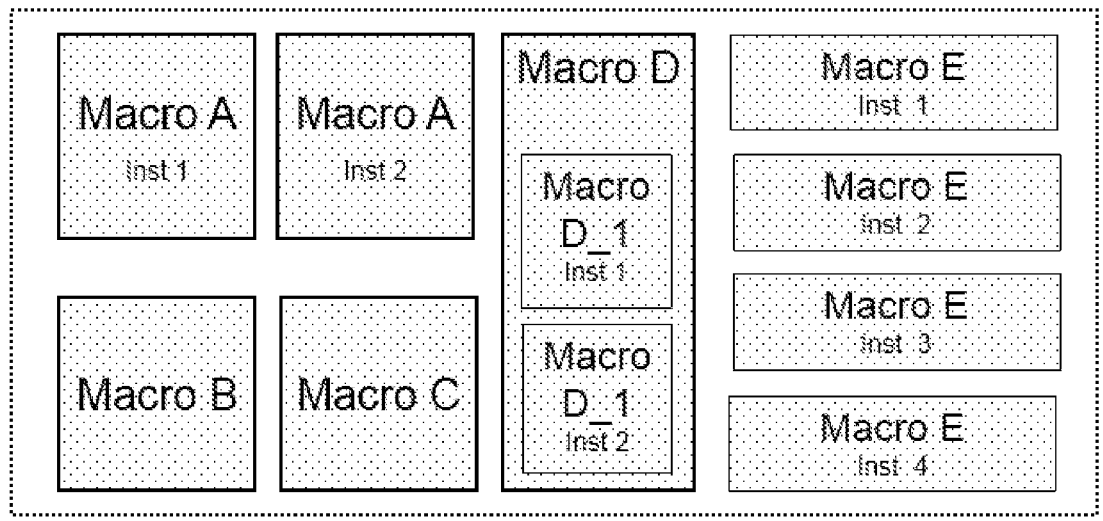
FIG. 8 is an illustrative representation of a hierarchical physical netlist where one of several abstract representations of the lower level component is instantiated in the next level component in a hierarchical design flow.

FIG. 7 shows an example of a hierarchical circuit representation 200D comprising lower level components represented by gate level netlists in entirety. The hierarchical representation included two instances of lower level components A, and single instances of lower level components B and C. It also includes an instance of multi-level component D and four instances of macro E. FIG. 8 shows the same hierarchical circuit representation 200E with the lower level components represented by the abstract timing models described earlier. The abstract representations allow significantly faster runtimes and more manageable memory requirements for the upper level designs.

In embodiments, lower level design components can be placed on the shelf and reused across the design (multi-core processor SOC) which significantly improves design efficiency. The abstract representation can be reused for each occurrence of the lower level design component leading to more manageable upper level design and significantly faster runtimes (e.g. 10×) and lower memory requirements for the upper level designs.

As described herein, Out of Context static timing analysis of the lower level component may be performed. Therefore, the circuit design of the upper level component and the lower level component can proceed concurrently which significantly improves design productivity.

Figure 9:
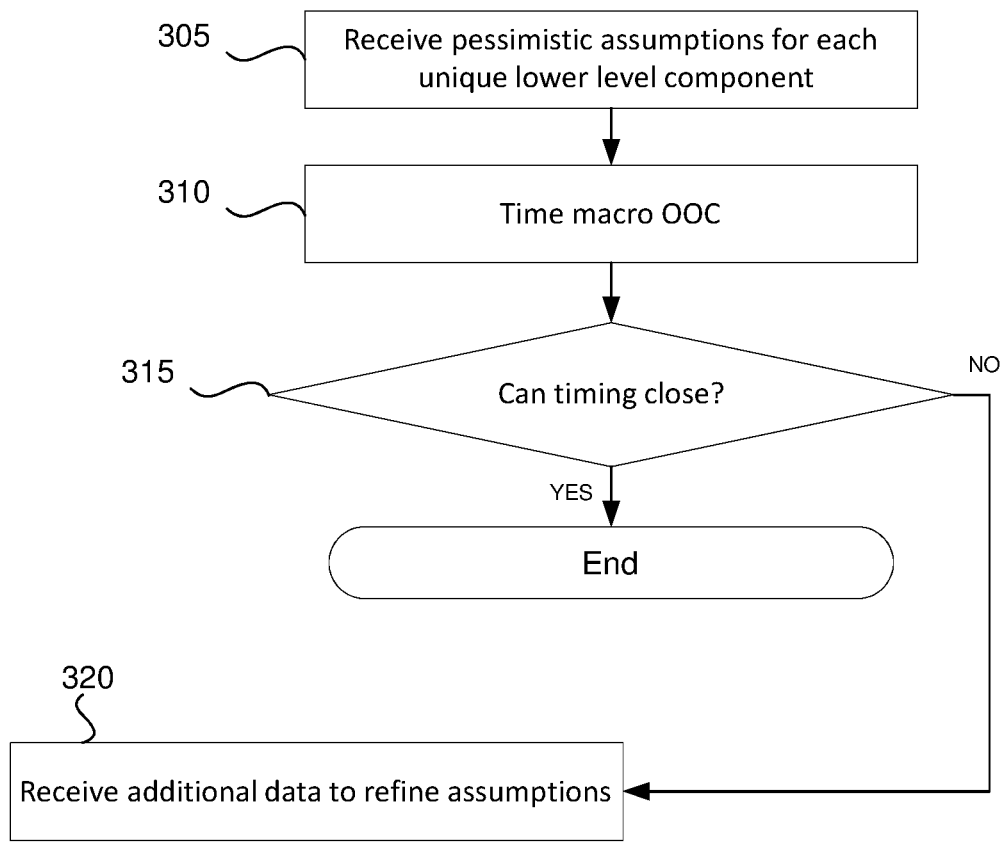
FIG. 9 is a flowchart illustrating the steps of a hierarchical design flow of a VLSI circuit, according to an embodiment of this invention.

FIG. 9 shows an example flowchart for an out of context static timing analysis process in accordance with aspects of the present invention. The steps of FIG. 9 may be implemented in the environment of FIG. 1, for example, and are described using reference numbers of elements depicted in FIG. 1. As noted above, the flowchart illustrates the architecture, functionality, and operation of possible implementations of systems, methods, and computer program products according to various embodiments of the present invention.

At step 305, pessimistic design assumptions are received for each unique lower level component. For example, the STA component 42 may receive the pessimistic design assumptions, e.g., from a database that stores design assumptions. In embodiments, the pessimistic design assumptions may include STA constraints, and the pessimistic design assumptions may be generated from design specifications stored in the database.

At step 310, out of context static timing analysis is performed on this lower level component. For example, the STA component 42 may perform the out of context static timing analysis using one or more known static timing analysis techniques.

At step 315, the results of the static timing analysis of the component are analyzed to determine whether the timing can be closed. For example, the STA component 42 may determine whether the timing can be closed using one or more timing analysis techniques known to those of ordinary skill in the art. If, for example, the timing cannot be closed (step 315-NO), additional data is received to refine the design assumptions for component timing closure (step 320). For example, the STA component 42 may receive additional data and refine the design assumptions. This additional data may be obtained from the implementation of the next level of hierarchy. For example during the out of context timing analysis of the lower level component the details of the next level clock implementation may not be known. However, once the clock is implemented for the next level component this can be used to refine the design assumptions of the lower level component.

Figure 10:
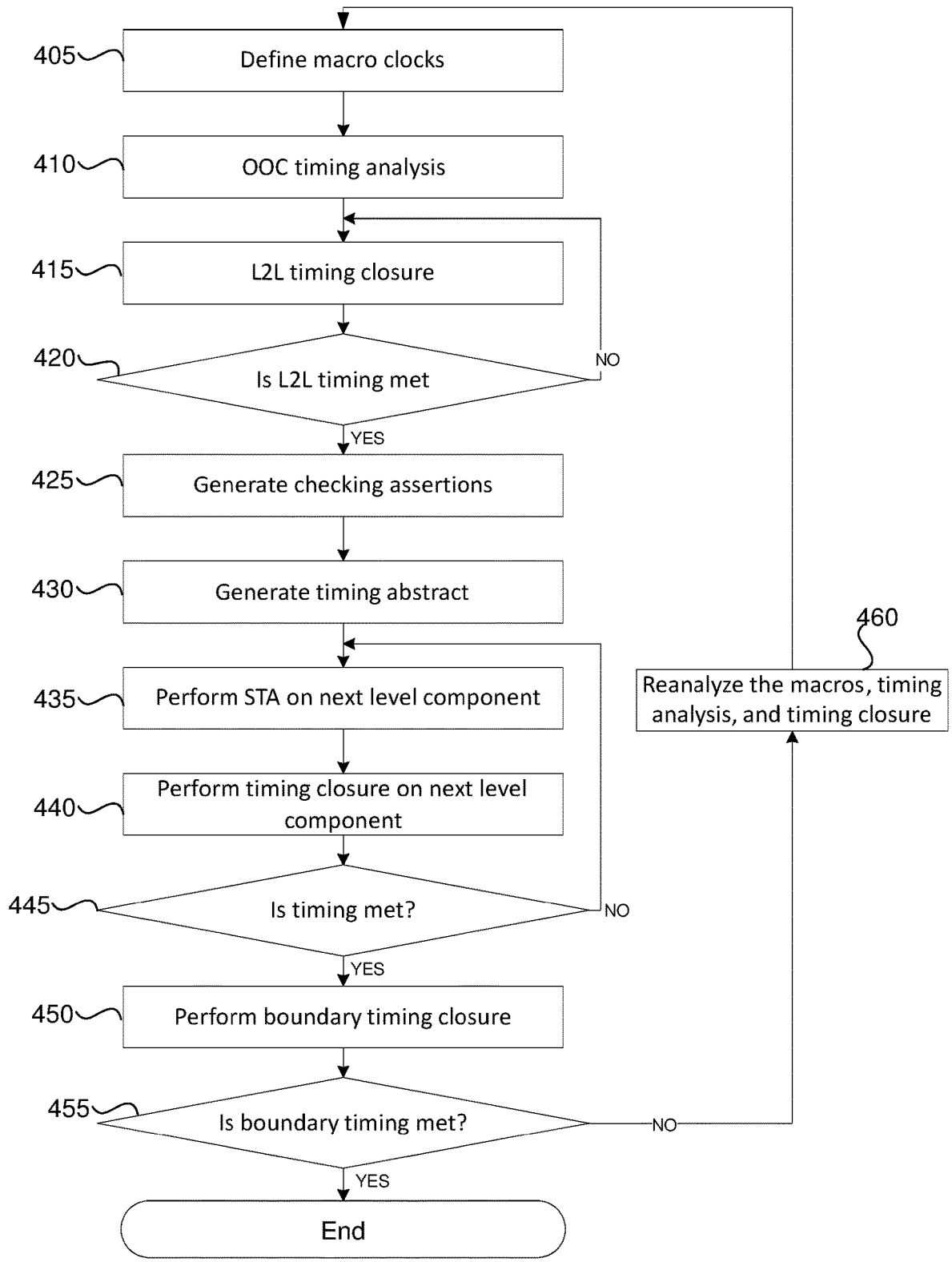
FIG. 10 is a flowchart illustrating the method and steps of a hierarchical design flow of a VLSI circuit, according to an embodiment of this invention.

FIG. 10 shows an example flowchart for closing L2L timing and boundary timing in accordance with aspects of the present invention. The steps of FIG. 10 may be implemented in the environment of FIG. 1, for example, and are described using reference numbers of elements depicted in FIG. 1. As noted above, the flowchart illustrates the architecture, functionality, and operation of possible implementations of systems, methods, and computer program products according to various embodiments of the present invention.

The process of FIG. 10 shows process steps for an out of context hierarchical static timing analysis of a component or block represented by a netlist in a hierarchical representation of a circuit design. At step 405, component clock (e.g., macro clock) definitions are derived from design specifications of the circuit or SOC. For example, the STA component 42 may obtain the design specifications from a database associated with the circuit or SOC.

At step 410, out of context static timing analysis is performed on a lower level component. Examples of the lower level component include a functional unit block or a synthesized random logic component. For example, the STA component 42 may perform the static timing analysis on the lower level component. At step 415, latch to latch (L2L) timing paths are analyzed and closed. At step 420, a determination is made as to whether L2L timing is met. If the L2L timing is not met (step 420-NO), L2L coming closure is repeated (at step 415) until L2L timing is met and L2L timing closure is completed.

At steps 425 and 430, a timing abstract or a timing model is generated as previously described. An abstract or timing model is a compact representation of the lower level component. This compact representation can be substituted in place of the full gate level netlist for the component at the next level of circuit design hierarchy. As an example, a compact representation, such as the compact representation 200B as shown in FIG. 5, can be substituted in place of a full gate level netlist for the component at the next level of circuit design hierarchy. Along with the abstract, additional checking assertions are generated which ensure the validity of the design assumptions made during lower level component static timing analysis. For example, the STA component 42 may generate the additional checking assertions, based on the timing model.

A step 435, static timing analysis on the next level component is performed. For example, the STA component 42 may perform the static timing analysis on the next level component by accessing the next level netlist representing the next level component of the circuit design and the timing constraints for the next level component (e.g., from a database storing the netlist). The STA component 42 may use the timing model data generated in steps 425 and 430 to perform the timing analysis on the next level component.

At steps 440 and 445, timing paths contained in the next level component are analyzed and closed. For example, at step 440 the STA component 42 may perform timing closure on the next level hierarchy component. The STA component 42 may determine whether timing has been met (step 445), and if the timing has not been met (step 445-NO), the STA component 42 may continue to performing timing analysis and timing closure (steps 435 and 440) until the timing has been met.

At step 450, boundary timing closure is performed. For example, the STA component 42 may perform the boundary timing closer by analyzing the interface timing paths between the next level component and the lower level component. In embodiments, boundary paths are defined as paths from Primary input (PI) to the first latch, paths from Latch to Primary output (PO), and feed-through paths. These paths are not analyzed during out of context analysis, since all the necessary timing data for accurately analyzing these paths is available only during in-context analysis.

At step 455, a determination is made as to whether macro boundary timing is met. For example, the STA component 42 may determine whether macro boundary timing is met. If, for example, the macro boundary timing is met (step 455-YES), the boundary timing closure and L2L timing closure is completed. If, on the other hand, the macro boundary timing is not met (step 455-NO), reanalysis of the macros, timing analysis, and timing closure may need to be performed (step 460).

As shown in FIG. 10, the L2L timing closure has a relatively quick turnaround time, however timing closure of the boundary paths may be a time consuming process as it requires re-analyzing macros which have been closed during OOC timing analysis. Timing convergence can also be a lengthy loop with iterations between the lower level hierarchy and upper level of hierarchy.

Figure 11:
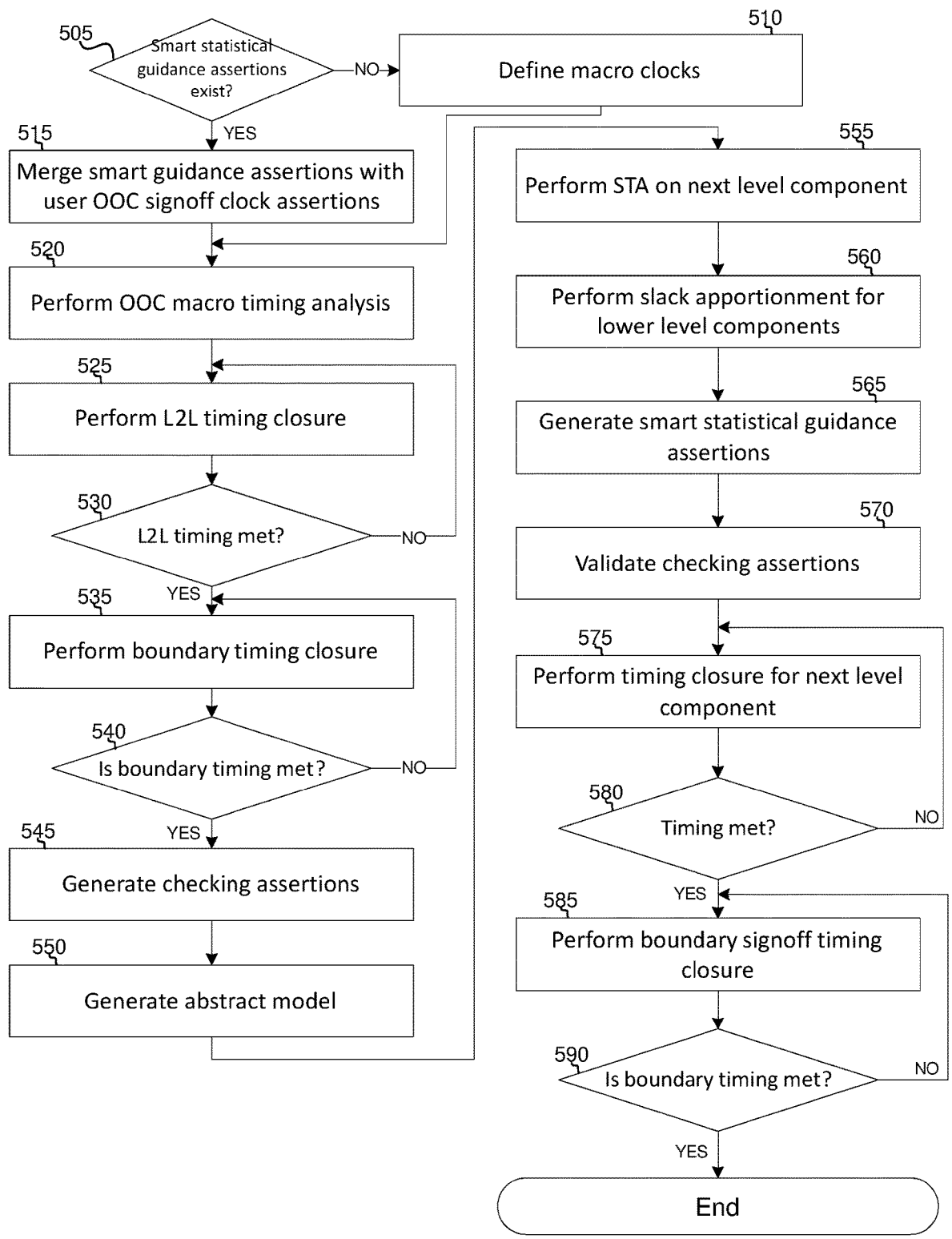
FIG. 11 is a flowchart illustrating embodiments of the invention for a hierarchical design flow of a VLSI circuit.

FIG. 11 shows an example flowchart for performing out of context static timing analysis in accordance with aspects of the present invention. The steps of FIG. 11 may be implemented in the environment of FIG. 1, for example, and are described using reference numbers of elements depicted in FIG. 1. As noted above, the flowchart illustrates the architecture, functionality, and operation of possible implementations of systems, methods, and computer program products according to various embodiments of the present invention.

The process of FIG. 11 may reduce or eliminate the reopening and reanalysis of lower level component blocks. For example, the reopening and reanalysis of lower level component blocks can be reduced or eliminated by generating smart guidance assertions during in context hierarchical analysis for OOC lower level component analysis of the boundary paths which are consistent with the OOC signoff assertions. These assertions may be used to guide the hierarchical design construction phase. The L2L paths may still be analyzed and signed off during OOC analysis. The signoff analysis for boundary paths may occur during in context analysis. The process of FIG. 11 illustrates steps for an out of context hierarchical static timing analysis of a component or block represented by a netlist in a hierarchical representation of a circuit design.

At step 505, smart guidance assertions generated during in-context analysis are applied for lower level component timing analysis. If these assertions do not currently exist (step 505-NO) then the process proceeds to step 510 in which component (macro) clock definitions are derived from the design specifications, e.g., in a similar manner as described above. At step 515, the smart guidance assertions are made consistent e.g., merged, with the OOC timing signoff assertions. Additional details regarding the generation of smart guidance assertions are described in greater detail below with respect to the process of FIG. 12.

At step 520, out of context static timing analysis is performed on the lower level component. At step 525 and 530, L2L timing paths are analyzed and closed, e.g., in a similar manner as described above with respect to steps 415 and 420. For example, if timing is not met (step 530-NO), step 525 may be repeated. If timing is met (step 530-YES), boundary timing closure is performed at step 535. For example, boundary timing paths are analyzed. At step 540, a determination is made as to whether boundary timing is met. If boundary timing is not met (step 540-NO), then step 535 is repeated. If boundary timing is met, then checking assertions are generated (step 545).

At step 550 a timing abstract or timing model is generated in a similar manner as described above with respect to steps 425 and 430. As described herein, an abstract or timing model is a compact representation of the lower level component. This compact representation can be substituted in place of the full gate level netlist for the component at the next level of circuit design hierarchy. As an example, a compact representation, such as the compact representation 200B as shown in FIG. 5, can be substituted in place of a full gate level netlist for the component at the next level of circuit design hierarchy. Along with the abstract additional checking assertions are generated which ensure the validity of the design assumptions made during lower level component static timing analysis.

At step 555, STA on the next level component is performed. For example, the STA component 42 may perform the STA by accessing, e.g., from a database, the next level netlist representing the next level component of the circuit design and the timing constraints for the next level component. Further, the STA component 42 may use the timing model data generated at steps 545 and 550 when performing the STA. At step 560, slack apportionment for the lower level components instantiated at this level of hierarchy is performed, e.g., by the STA component 42.

At step 565, smart guidance assertions (e.g., smart statistical guidance assertions) are generated. For example, the STA component 42 may generate the smart statistical guidance assertions, and these assertions are then used in step 505. Additional details regarding the generation of the smart guidance assertions are described with respect to FIG. 12.

At step 570, the checking assertions generated at step 545 are validated. For example, the STA component 42 may validate the checking assertions to ensure the validity of the design assumptions made during lower level component static timing analysis.

At steps 575, timing closure is performed for the next level component. For example, the STA component 42 may analyze and close the timing paths in a similar manner as described above. At step 580, a determination is made as to whether the timing has been met. If the timing is not met (step 580-NO), step 575 is repeated.

If the timing is met (step 580-YES), boundary signoff timing closure is performed at step 585. In embodiments, the interface timing paths between the next level component and the lower level component are analyzed for boundary timing closure. For example, the STA component 42 may analyze the interface timing paths between the next level component and the lower level component for boundary timing closure. Boundary paths are defined as paths from a Primary input (PI) to a first latch. In embodiments, paths from Latch to Primary output (PO) and feed-through paths may not be analyzed during OOC analysis as all the necessary timing data for accurately analyzing these paths may be available only during in-context analysis.

For OOC timing signoff for lower level components the designers are responsible for defining all the clock assertions at the clock pins. This implies an iterative refinement of assumptions. A relatively accurate estimate of the clock specification would mean fewer iterations while pessimistic assumptions would mean that it would be difficult to close timing on the lower level component. Clock specification is difficult to guess/estimate because of the uncertainty in physical implementation of a complex hierarchical design with clock trees and also due to the split of common path pessimism removal (CPPR) credit between the macros and the next level of hierarchy. The iterative nature of the process can be addressed by providing guidance assertions consistent with OOC signoff thereby reducing TAT. Optimization of the clock specification would also entail pessimism reduction and faster timing closure through a quickly converged clock solution.

At step 590, a determination is made as to whether the boundary timing is met. If the boundary timing is not met (step 590-NO), step 585 is repeated. If the boundary timing not met (step 590-YES), the process of FIG. 11 is concluded.

Figure 12:
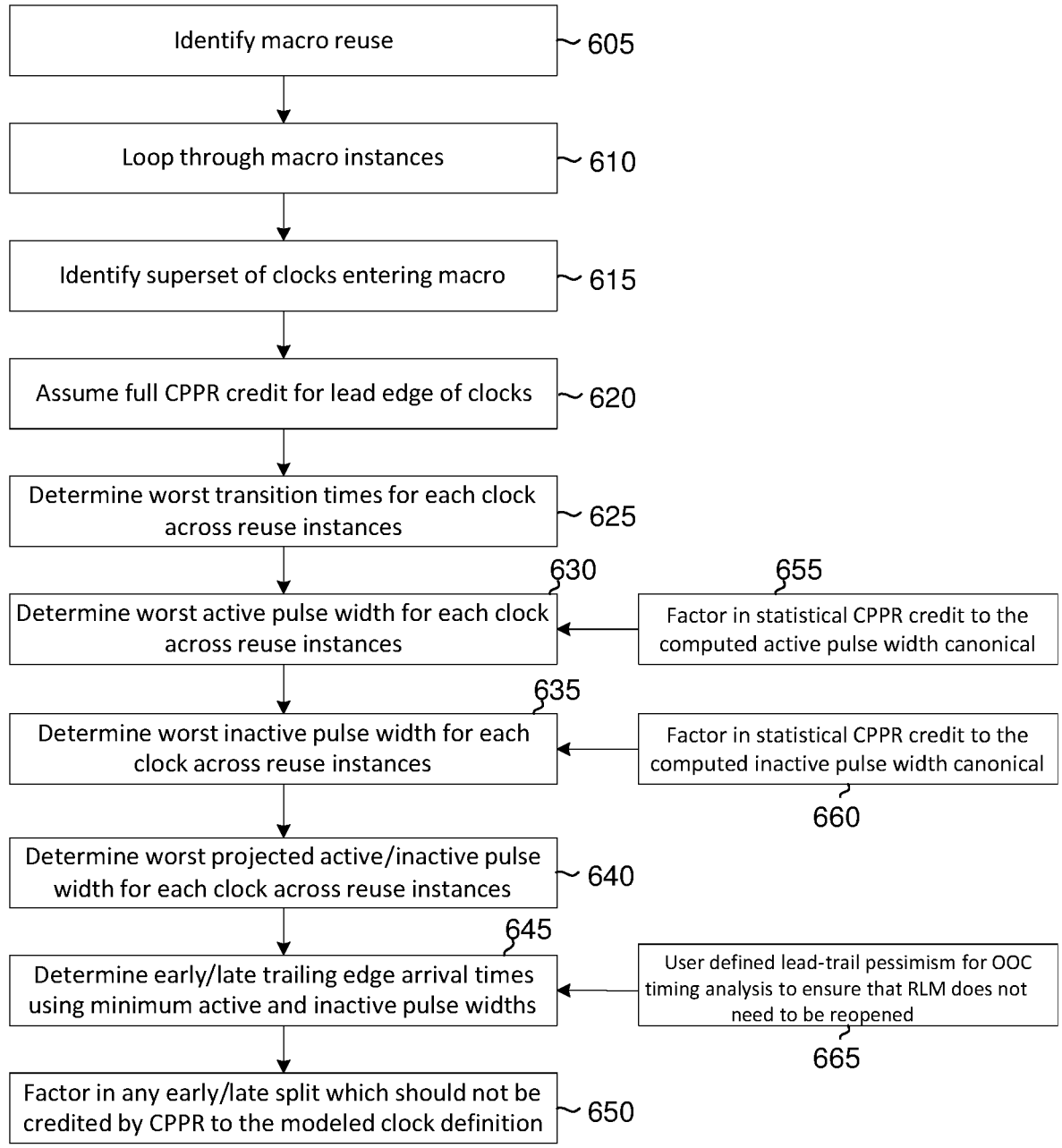
FIG. 12 is a flowchart illustrating the clock specification according to embodiments of the invention for a hierarchical design flow of a VLSI circuit.

FIG. 12 shows a flowchart of an example process for generating guidance assertions for lower level component clock definitions for reducing timing pessimism during out of context component level analysis, in accordance with aspects of the present invention. The steps of FIG. 12 may be implemented in the environment of FIG. 1, for example, and are described using reference numbers of elements depicted in FIG. 1. As noted above, the flowchart illustrates the architecture, functionality, and operation of possible implementations of systems, methods, and computer program products according to various embodiments of the present invention.

At step 605, macro reuse and the reuse instances are identified, e.g., by looping through the macro instances (at step 610). For example, the STA component 42 may identify the macro reuse and reuse instances by looping through the macro instances by analyzing a database identifying the macro reuse and reuse instances across multiple circuit designs.

At step 615, a superset of all the clocks entering the macro are identified. For example, the STA component 42 may identify the superset of all the clocks entering the macro by accessing a database identifying the clocks, and selecting the superset of the clocks.

At step 620, the clock definitions are defined by assuming full CPPR credit for the lead edge of the clocks. For example, the STA component 42 may define the clock definitions.

At step 625, the worst transition time for each clock is computed across the reuse instances. For example, the STA component 42 may select the worst or slowest transition time for each clocks across the reuse instances.

At step 630, the worst active pulse width for each clock across reuse instances is computed. For example, the STA component 42 may select the worst or slowest active pulse width for each clock. As part of the worst active pulse width computation, statistical or deterministic CPPR credit is computed at step 655, and factored into the pulse width canonical At step 635, the worst inactive pulse width for each clock across reuse instances is computed. For example, the STA component 42 may select the worst or slowest inactive pulse width for each clock. As part of the worst inactive pulse width computation, statistical or deterministic CPPR credit is computed at step 660, and factored into the pulse width canonical.

At step 645, the minimum active and inactive pulse width are used to determine the early/late trailing edge arrival times for the macro clock specifications. For example, the STA component 42 may determine the early/late trailing edge arrival times for the macro clock specifications based on the minimum active and inactive pulse widths. Also, any user defined lead-trail pessimism for OOC timing analysis is included from step 665 to ensure that lower level component does not need to be reopened for timing analysis.

At step 650, any early/late split which should not be credited by CPPR is factored into the modeled clock definition. The process of FIG. 12 automatically factors in jitter, duty cycle distortion for PLLs or other effects. The early/late split in step 650 could be due to coupling, history effect, clock reconvergence at the next level of hierarchy. While this may be captured by design guidelines validation, a mechanism to implement pessimism would be provided.

Figure 13:
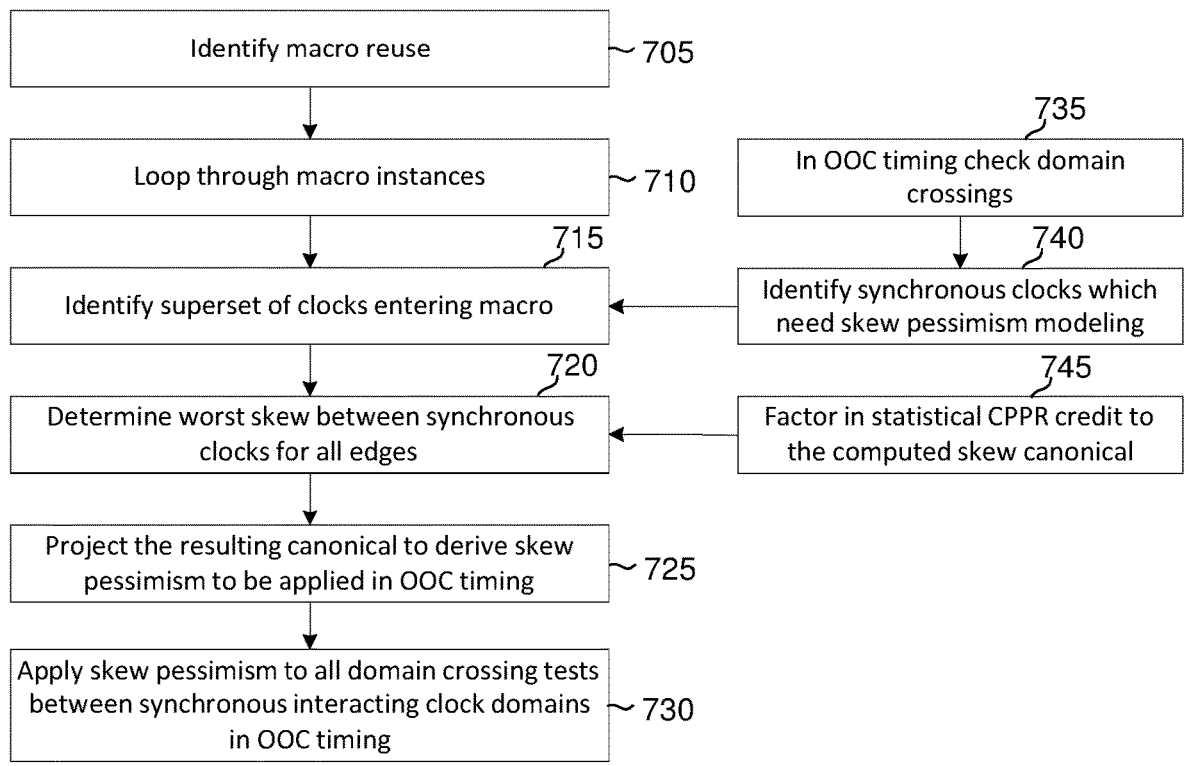
FIG. 13 is a flowchart illustrating the clock skew specification according to embodiments of the invention for a hierarchical design flow of a VLSI circuit.

FIG. 13 shows an example flowchart for guiding skew pessimism allowance for interacting clocks for all edges in OOC timing analysis in accordance with aspects of the present invention. The steps of FIG. 13 may be implemented in the environment of FIG. 1, for example, and are described using reference numbers of elements depicted in FIG. 1. As noted above, the flowchart illustrates the architecture, functionality, and operation of possible implementations of systems, methods, and computer program products according to various embodiments of the present invention.

The process of FIG. 13 may eliminate a substantial amount of pessimism in OOC timing analysis with synchronous interacting clocks. In OOC timing analysis no CPPR credit is given to synchronous paths between domains since all the credit is expected to be integrated into the clock definitions at the macro boundaries.

At step 705 macro reuse are identified, e.g., by the STA component 42 as described above. At step 710, macro instances are looped through. At step 715, a superset of all the clocks entering the macro are identified, e.g., by the STA component 42 e.g., by looping through the macros. During OOC timing analysis (step 735), domain crossings are checked, e.g., by the STA component 42. At step 740, the synchronous clocks which need skew pessimism modeling are identified, e.g., by the STA component 42. Information regarding the synchronous clocks which need skew pessimism modeling is used in the above in-context step 715 of the process of FIG. 13.

At 720, the worst skew between the synchronous clocks which need the skew pessimism modeling for all the edges is determined, e.g., by the STA component 42. At step 745, the deterministic or statistical CPPR credit, which is included in the skew computation for synchronous interacting clocks for step 720, is computed, e.g., by the STA component 42. At step 725, statistical timing analysis skew canonical is projected to derive skew pessimism to be applied during OOC timing analysis, e.g., by the STA component 42. At step 730, the individual skew pessimisms computed in the above steps is applied to all domain crossing tests between synchronous interacting clock domains in OOC timing analysis, e.g., by the STA component 42.

Figure 14:
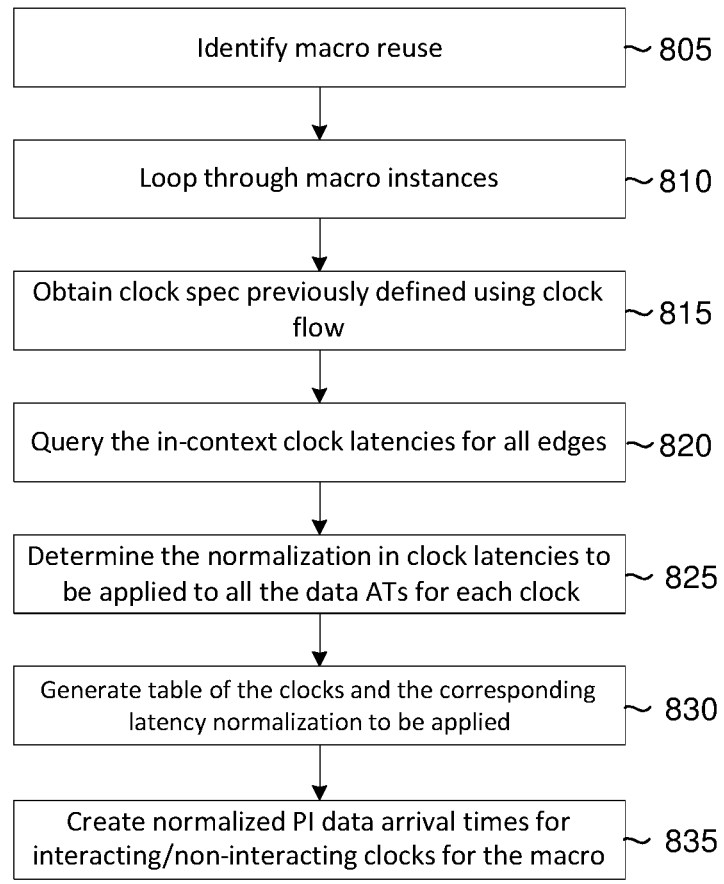
FIG. 14 is a flowchart illustrating the PI/PO data assertions according to embodiments of the invention for a hierarchical design flow of a VLSI circuit.

FIG. 14 shows a flowchart for generating the data assertions for boundary paths (including primary input (PI) to latch, latch to primary output and data feed-through paths) for guiding the design construction phase in a hierarchical design flow based on defining the clock specification, in accordance with aspects of the present invention. The steps of FIG. 12 may be implemented in the environment of FIG. 1, for example, and are described using reference numbers of elements depicted in FIG. 1. As noted above, the flowchart illustrates the architecture, functionality, and operation of possible implementations of systems, methods, and computer program products according to various embodiments of the present invention.

At steps 805 macro reuse and the reuse instances are identified, e.g., by the STA component 42. At step 810, macro instances are looped through. At step 815, the clock spec defined earlier using the above mentioned clock flow is retrieved, e.g., by the STA component 42. At step 820, the in-context clock latencies for all edges are queried, e.g., by the STA component 42. At step 825, the normalization in clock latencies to be applied to all the data arrival times (AT) for each clock are determined, e.g., by the STA component 42.

At step 830, a look up table of the clocks and the corresponding latency normalization to be applied is populated, e.g., by the STA component 42. At step 835, normalized PI data arrival times for data belonging to both interacting and non-interacting clocks domains for the macro are generated, e.g., by the STA component 42. Note that since the clock latencies have been normalized and therefore the data arrival times at the primary outputs of the macro have also been normalized. In order to consistently constrain the Primary Output (PO) to latch paths and the feed-through paths the PO required time assertions have to be normalized in a similar fashion. This may be accomplished using the same clock table derived for normalizing the PI assertions. The PI/PO data assertions are reuse-aware.

In embodiments, a service provider, such as a Solution Integrator, could offer to perform the processes described herein. In this case, the service provider can create, maintain, deploy, and support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for reducing timing pessimism during Out of Context component level analysis. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a CPU, a computer readable memory, and a computer readable storage medium associated with a computing device, wherein the computer readable storage medium is not a transitory signal per se;
program instructions to identify instances in which a lower level component is used in a circuit design;
program instructions to obtain a clock specification associated with the lower level component;
program instructions to query in-context clock latencies for all edges associated with the lower level component;
program instructions to determine a normalization in clock latencies to be applied to all data arrival times (AT) for each clock;
program instructions to populate a look up table of the clocks and the corresponding latency normalization to be applied; and
program instructions to generate normalized primary input (PI) data arrival times for data belonging to both interacting and non-interacting clocks domains for the component,
wherein the program instructions are stored on the computer readable storage medium for execution by the CPU via the computer readable memory.

2. The system of claim 1, wherein the normalized PI data arrival times correspond to data assertions for boundary paths including PI to latch, latch to primary output, and data feed-through paths for the lower level component.

3. The system of claim 1, further comprising:
program instructions to identify a superset of all clocks entering the lower level component; and
program instructions to define clock definitions by assuming a full common path pessimism removal (CPPR) credit for a leading edge of the clocks.

4. The system of claim 3, further comprising program instructions to determine a slowest transition time for each clock, based on defining the clock definitions.

5. The system of claim 4, further comprising program instructions to determine slowest projected active and inactive pulse widths for each clock based on computing the slowest transition time for each clock.

6. The system of claim 5, further comprising program instructions to determine early and late trailing edge arrival times for the lower level component based on determining the slowest projected active and inactive pulse widths, wherein determining the early and late trailing edge arrival times is based on early and late splits which should be credited by the CPPR.

7. The system of claim 1, wherein the circuit design is a Very Large Scale Integrated (VLSI) design or a system on chip (SOC).

8. The system of claim 1, further comprising program instructions to perform an out of context timing closure for the lower level component based on performing deterministic or statistical static timing analysis.

9. The system of claim 8, wherein the timing closure includes internal latch to latch timing closure.

10. The system of claim 8, wherein the timing closure includes a boundary timing closure.

11. The system of claim 8, further comprising program instructions to perform an out of context deterministic or statistical static timing analysis on a next level design component by incorporating a netlist of the next level and constraints of the next level, wherein results of the out of context static timing analysis of the lower level design component is substituted in place of a full gate level netlist for the lower level component at a next level of circuit design hierarchy.

* * * * *